United States Patent
Woodman

(10) Patent No.: US 11,153,657 B1
(45) Date of Patent: Oct. 19, 2021

(54) INTERFACE FOR EDITING MULTIPLE VIDEO CLIPS

(71) Applicant: GoPro, Inc., San Mateo, CA (US)

(72) Inventor: Nicholas Woodman, Big Sky, MT (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/947,016

(22) Filed: Jul. 15, 2020

(51) Int. Cl.
*H04N 21/472* (2011.01)
*G06F 3/0484* (2013.01)
*G11B 27/031* (2006.01)
*H04N 21/44* (2011.01)

(52) U.S. Cl.
CPC ... *H04N 21/47205* (2013.01); *G06F 3/04842* (2013.01); *G11B 27/031* (2013.01); *H04N 21/44016* (2013.01)

(58) Field of Classification Search
CPC ....... H04N 21/47205; H04N 21/44016; G11B 27/031; G06F 3/04842
USPC ......................................................... 386/282
See application file for complete search history.

(56) References Cited

U.S. PATENT DOCUMENTS

| | | | |
|---|---|---|---|
| 8,413,184 B2* | 4/2013 | Angquist | G11B 27/034 |
| | | | 725/38 |
| 2007/0233602 A1* | 10/2007 | Zweig | H04L 63/10 |
| | | | 705/51 |
| 2016/0316280 A1* | 10/2016 | Bulley | H04N 21/47202 |
| 2017/0110151 A1* | 4/2017 | Matias | G06K 9/00758 |
| 2020/0268457 A1* | 8/2020 | Wolf | G16H 20/40 |

* cited by examiner

*Primary Examiner* — Loi H Tran
(74) *Attorney, Agent, or Firm* — Esplin & Associates, PC

(57) ABSTRACT

Multiple video clips may be selected for use in generating a video edit. A graphical user interface for editing the multiple video clips may include a combined progress length element. The combined progress length element may visually represent combined progress length of the multiple video clips.

20 Claims, 8 Drawing Sheets

INTERFACE FOR EDITING MULTIPLE VIDEO CLIPS

FIELD

This disclosure relates to an interface for editing multiple video clips.

BACKGROUND

A user may wish to create a video edit from multiple video clips. Multiple progress bars may be shown within a user interface to separately represent lengths of individual video clips. Such representation of video clips may require a user to alternate between different video clips/progress bars when selecting video portions to be added to the video edit, making multi-clip video editing cumbersome.

SUMMARY

This disclosure relates to an interface for editing multiple video clips. Selection of multiple video clips for use in generating a video edit may be obtained. Individual ones of the multiple video clips may have a progress length. The multiple video clips may include a first video clip having a first progress length, a second video clip having a second progress length, and/or other video clips. A graphical user interface may be presented on a display. The graphical user interface may include interface elements that facilitate selection of video portions of the multiple video clips for inclusion in the video edit. The interface elements may include a combined progress length element and/or other interface elements. The combined progress length element may visually represent combined progress length of the multiple video clips. The combined progress length element may include a first portion, a second portion continuous with the first portion, and/or other portions. The first portion of the combined progress length element may visually represent the first progress length of the first video clip and the second portion of the combined progress length element may visually represent the second progress length of the second video clip.

Selection of the video portions of the multiple video clips for inclusion in the video edit may be obtained. The selected video portions may include a first video portion, a second video portion, and/or other video portions. The second video portion may be non-adjacent to the first video portion. The first video portion may correspond to a first segment of the combined progress length element and the second video portion may correspond to a second segment of the combined progress length element. Inclusion marker elements for the selected video portions may be presented. The inclusion marker elements may visually indicate the selected video portions using the combined progress length element. The inclusion marker elements may include a first inclusion marker element, a second inclusion marker element, and/or other inclusion marker elements. The first inclusion marker element may visually mark the first segment of the combined progress length element corresponding to the first video portion, and the second inclusion marker element may visually mark the second segment of the combined progress length element corresponding to the second video portion.

Presentation of the video edit on the display may include movement of a current position element along the combined progress length element to visually indicate current position of the presentation along the combined progress length of the multiple video clips. The current position element may skip from end of the first segment of the combined progress length element to beginning of the second segment of the combined progress length element during transition of the presentation of the video edit from end of the first video portion to beginning of the second video portion.

A system that presents an interface for editing multiple video clips may include one or more electronic storage, processor, and/or other components. The electronic storage may store information relating to video clips, information relating to progress lengths of video clips, information relating to graphical user interface, information relating to interface elements, information relating to combined progress length element, information relating to video portions, information relating to inclusion marker element, information relating to video edit, and/or other information.

The processor(s) may be configured by machine-readable instructions. Executing the machine-readable instructions may cause the processor(s) to facilitate presenting an interface for editing multiple video clips. The machine-readable instructions may include one or more computer program components. The computer program components may include one or more of a video clip selection component, a graphical user interface component, a video portion selection component, an inclusion marker component, and/or other computer program components.

The video clip selection component may be configured to obtain selection of multiple video clips for use in generating a video edit. Individual ones of the multiple video clips may have a progress length. The multiple video clips may include a first video clip having a first progress length, a second video clip having a second progress length, and/or other video clips.

The graphical user interface component may be configured to present a graphical user interface on a display. The graphical user interface may include interface elements that facilitate selection of video portions of the multiple video clips for inclusion in the video edit. The interface elements may include a combined progress length element and/or other interface elements. The combined progress length element may visually represent combined progress length of the multiple video clips. The combined progress length element may include a first portion, a second portion, and/or other portions. The second portion may be continuous with the first portion. The first portion of the combined progress length element may visually represent the first progress length of the first video clip, and the second portion of the combined progress length element may visually represent the second progress length of the second video clip.

In some implementations, the combined progress length element may extend continuously in a single direction to visually represent the combined progress length of the multiple video clips.

In some implementations, ordering of the multiple video clips on the combined progress length element may be determined based on user input and/or other information. In some implementations, ordering of the multiple video clips in the combined progress length element is determined based on content of the multiple video clips and/or other information.

The video portion selection component may be configured to obtain the selection of the video portions of the multiple video clips for inclusion in the video edit. The selected video portions may include a first video portion, a second video portion, and/or other video portions. The second video portion may be non-adjacent to the first video portion. The first video portion may correspond to a first segment of the combined progress length element, and the second video portion may correspond to a second segment of the combined progress length element.

In some implementations, ordering of the selected video portions in the video edit may be determined based on user input and/or other information. In some implementations, ordering of the selected video portions in the video edit may be determined based on content of the selected video portions and/or other information.

The inclusion marker component may be configured to present inclusion marker elements for the selected video portions. The inclusion marker elements may visually indicate the selected video portions using the combined progress length element. The inclusion marker elements may include a first inclusion marker element, a second inclusion marker element, and/or other inclusion marker elements. The first inclusion marker element may visually mark the first segment of the combined progress length element corresponding to the first video portion, and the second inclusion marker element may visually mark the second segment of the combined progress length element corresponding to the second video portion.

Presentation of the video edit on the display may include movement of a current position element along the combined progress length element to visually indicate current position of the presentation along the combined progress length of the multiple video clips. The current position element may skip from end of the first segment of the combined progress length element to beginning of the second segment of the combined progress length element during transition of the presentation of the video edit from end of the first video portion to beginning of the second video portion.

In some implementations, position of the current position element may be manipulable along combined progress length element to change the current position of the presentation along the combined progress length of the multiple video clips.

In some implementations, the first inclusion marker element may be manipulable along the combined progress length element to change position of the first video portion along the combined progress length of the multiple video clips. Manipulation of the first inclusion marker to extend or shrink the first inclusion marker along the combined progress length element may cause a length of the first video portion to increase or decrease. Manipulation of the first inclusion marker to shift the first inclusion marker along the combined progress length element may cause beginning and end of the first video portion to shift.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
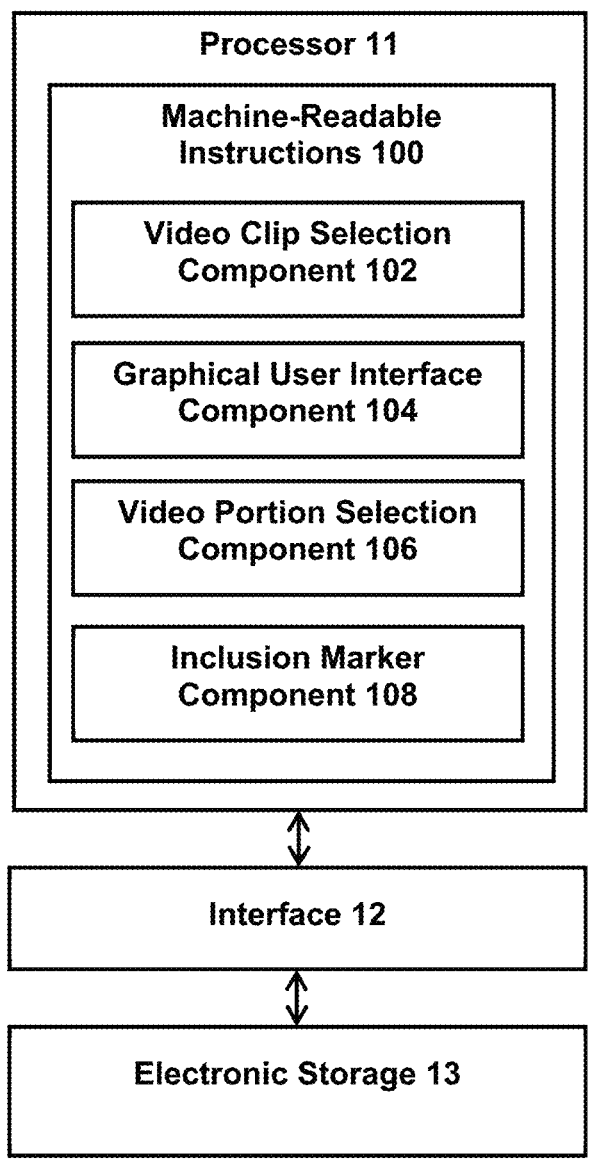
FIG. 1 illustrates a system that presents an interface for editing multiple video clips.

FIG. 1 illustrates a system 10 that presents an interface for editing multiple video clips. The system 10 may include one or more of a processor 11, an interface 12 (e.g., bus, wireless interface), an electronic storage 13, and/or other components. Selection of multiple video clips for use in generating a video edit may be obtained by the processor 11. Individual ones of the multiple video clips may have a progress length. The multiple video clips may include a first video clip having a first progress length, a second video clip having a second progress length, and/or other video clips. A graphical user interface may be presented by the processor 11 on a display. The graphical user interface may include interface elements that facilitate selection of video portions of the multiple video clips for inclusion in the video edit. The interface elements may include a combined progress length element and/or other interface elements. The combined progress length element may visually represent combined progress length of the multiple video clips. The combined progress length element may include a first portion, a second portion continuous with the first portion, and/or other portions. The first portion of the combined progress length element may visually represent the first progress length of the first video clip and the second portion of the combined progress length element may visually represent the second progress length of the second video clip.

Selection of the video portions of the multiple video clips for inclusion in the video edit may be obtained by the processor 11. The selected video portions may include a first video portion, a second video portion, and/or other video portions. The second video portion may be non-adjacent to the first video portion. The first video portion may correspond to a first segment of the combined progress length element and the second video portion may correspond to a second segment of the combined progress length element. Inclusion marker elements for the selected video portions may be presented by the processor 11. The inclusion marker elements may visually indicate the selected video portions using the combined progress length element. The inclusion marker elements may include a first inclusion marker element, a second inclusion marker element, and/or other inclusion marker elements. The first inclusion marker element may visually mark the first segment of the combined progress length element corresponding to the first video portion, and the second inclusion marker element may visually mark the second segment of the combined progress length element corresponding to the second video portion.

Presentation of the video edit on the display may include movement of a current position element along the combined progress length element to visually indicate current position of the presentation along the combined progress length of the multiple video clips. The current position element may skip from end of the first segment of the combined progress length element to beginning of the second segment of the combined progress length element during transition of the presentation of the video edit from end of the first video portion to beginning of the second video portion.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to video clips, information relating to progress lengths of video clips, information relating to graphical user interface, information relating to interface elements, information relating to combined progress length element, information relating to video portions, information relating to inclusion marker element, information relating to video edit, and/or other information.

A video edit may refer to an arrangement and/or a manipulation of one or more video portions of one or more video clips. A video portion of a video clip may refer to a temporal portion of the video clip and/or a spatial portion of the video clip. For example, a video portion of a video clip may include a shorter duration of the video clip and/or a smaller field of view/punchout of the video clip. A video edit may define which video portions (e.g., temporal portions of video clips, spatial portions of video clips) are included for playback and the order in which the video portions are to be presented on playback. A video edit may be generated as an encoded version of the video edit and/or as instructions for rendering the video edit. For example, the video edit may be encoded as a video clip, and the video clip may be opened in a video player for presentation. The video edit may be generated as instructions for presenting the video edit, such as instructions that identify arrangements and/or manipulations of video portions included in the video edit. For example, the video edit may be generated as information defining a director track that includes information as to which video portions of the video clips are included in the video edit, the order in which the video portions are to the presented on playback, and the edits to be applied to the different video portions. A video player may use the director track to retrieve the video portions of the video clips identified in the video edit for presentation, arrangement, and/or editing when the video edit is opened/to be presented.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate presenting an interface for editing multiple video clips. The machine-readable instructions 100 may include one or more computer program components. The machine-readable instructions 100 may include one or more of a video clip selection component 102, a graphical user interface component 104, a video portion selection component 106, an inclusion marker component 108, and/or other computer program components.

The video clip selection component 102 may be configured to obtain selection of multiple video clips for use in generating a video edit. Obtaining selection of multiple video clips for use in generating a video edit may include one or more of accessing, acquiring, analyzing, determining, examining, identifying, loading, locating, opening, receiving, retrieving, reviewing, storing, and/or otherwise obtaining the selection of multiple video clips for use in generating the video edit. Selection of multiple video clips for use in generating a video edit may be obtained from a storage location, such as the electronic storage 13, from one or more hardware components, from one or more software components, from a user, and/or from other locations. For example, selection of multiple video clips for use in generating a video edit may have been stored in one or more files in a storage location, and the video clip selection component 102 may obtain the file(s) to obtain the selection. Selection of multiple video clips for use in generating a video edit may be obtained from hardware component(s) and/or software component(s) relaying user selection of the video clips through one or more graphical user interfaces.

In some implementations, selection of multiple video clips for use in generating a video edit may be obtained based on user input and/or other information. User input may refer to input received from a user. User input may define, characterize, and/or otherwise be used to determine selection of video clips for use in generating a video edit. For example, a user may utilize one or more graphical user interfaces to select the video clips to be used in generating the video edit, and the selection of the video clips may be obtained based on user input received through user interaction with the graphical user interface(s).

In some implementations, selection of multiple video clips for use in generating a video edit may be obtained based on analysis of the video clips, analysis of information associated with the video clips, and/or other information. For example, video clips may be selected for use in generating the video edit based on highlight moments/events within the video clips. A highlight moment may refer to a moment at which a highlight event occurs. A highlight event may refer to an exciting, interesting, and/or an important event, such as a high point or a climax of an activity being performed by one or more persons. A highlight event may be an event of interest. The video clips may be selected for use in generating the video edit based on occurrence, number, and/or types of highlight moments/events within the video clips.

A highlight moment/event may be detected and/or classified based on analysis of visual content (e.g., content of video frames) of the video clips, such as based on blur detection, color analysis, face recognition, histogram analysis, object recognition, activity recognition, scene recognition, salience detection, emotion recognition, and/or other analysis of the visual content of the video clips. A highlight moment/event may be detected and/or classified based on analysis of audio content (e.g., recorded sound) of the video clips, such as based on voice recognition, command recognition, activity recognition, emotion detection, and/or other analysis of the audio content of the video clips. A highlight moment/event may be detected and/or classified based on analysis of metadata (e.g., telemetry data, GPS data, IMU data, speed data, velocity data, acceleration data, rotation data, user-designated highlight data) of the video clips, such as based on motion of the image capture device indicating occurrence of highlight moment/event and/or based on user interaction with a highlight button of the image capture device. Other selections of video clips for use in generating the video edit are contemplated.

Individual video clips selected for use in generating a video edit may have a progress length. A progress length of a video clip may be defined in terms of time durations and/or frame numbers. For example, a video clip may have a time duration of 60 seconds. A video clip may have 1800 video frames. A video clip having 1800 video frames may have a play time duration of 60 seconds when viewed at 30 frames per second. Other progress lengths are contemplated.

Figure 3:
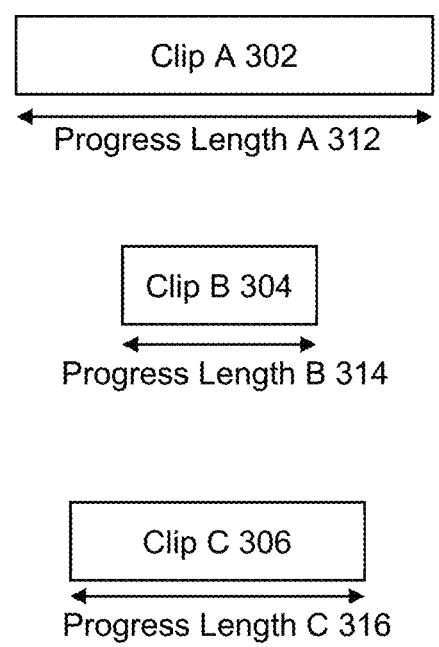
FIG. 3 illustrates example video clips selected for use in generating a video edit.

FIG. 3 illustrates example video clips selected for use in generating a video edit. Video clips selected for use in generating a video edit may include a clip A 302, a clip B 304, a clip C 306, and/or other clips. The clip A 302 may have a progress length A 312, the clip B 304 may have a progress length B 314, and the clip C 306 may have a progress length C 316. The progress length A 312 may be longer than the progress length B 314 and the progress length C 316, and the progress length C may be longer than the progress length B 314. Selection of other video clips are contemplated.

The graphical user interface component 104 may be configured to present a graphical user interface on a display. A graphical user interface may refer to a user interface that enables a user to interact with the system 10 through one or more interface element. A graphical user interface may be static or dynamic. A graphical user interface may include a static configuration of interface elements and/or include dynamic configurations of interface elements that changes (e.g., with time, based on user interaction with one or more interface elements). Multiple/different interface elements may be presented/included within a graphical user interface at the same time, may be presented/included within a graphical user interface at different times, and/or may be presented/included within a graphical user interface responsive to user interaction with one or more other interface elements and/or other information.

An interface element may refer to a graphical element of the user interface, such as window, icon, button, graphic, and/or other visual indicator. An interface element may visually provide information and/or enable a user to provide inputs to the system 10. For example, an interface element may visually provide information determined by the system 10 and/or a user may interact (e.g., engage, toggle, manipulate) with an interface element to provide one or more input to the system 10. A graphical user interface may facilitate interaction of the user with one or more of the interface elements via the user input received through one or more user interface devices (e.g., a touchscreen display, a keyboard, a mouse, a trackpad). For example, a graphical user interface may present/include the interface elements in a particular arrangement and enable the user to interact with individual interface elements by engaging with locations corresponding to the individual interface elements on a touchscreen display (e.g., of a mobile device).

The graphical user interface may include interface elements that facilitate selection of video portions of the multiple video clips for inclusion in the video edit. Such interface elements may visually provide information on video portions of the video clips that have been selected to be included in the video edit. A user may interact with such interface elements to change selection of video portions to be included in the video edit. A video portion of a video clip may refer to a part of the video clip. A video portion of a video clip may be defined in terms of time durations and/or frame numbers. For example, a video clip may have a progress length of 60 seconds, and the video portion may include a temporal portion (e.g., from 1 second mark to 2 second mark of the video clip) of the progress length video clip. A video clip may have a progress length of 1800 video frames, and the video portion may include a subset of video frames (e.g., video frames 31-60) of the video clip.

The interface elements may include a combined progress length element and/or other interface elements. The combined progress length element may refer to an interface element that visually represents combined progress length of the multiple video clips selected for use in generating the video edit. Combined progress length of the video clips may refer to combination of the progress lengths of the individual video clips. Combined progress length of the video clips may refer to sum of the progress lengths of the individual video clips. Different portions of the combined progress length element may visually represent progress lengths of different video clips. The combined progress length element may function as a seek bar/scubber for all of the video clips selected for use in generating the video edit.

Figure 4A:
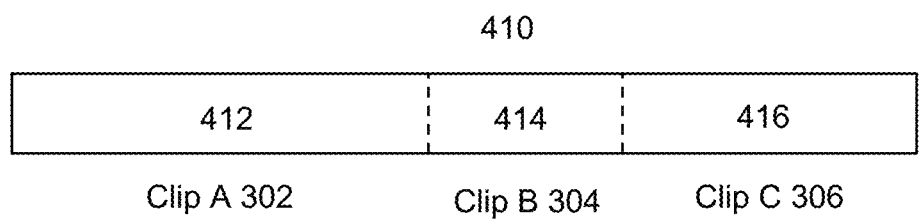
FIGS. 4A, 4B, and 4C illustrate example combined progress length elements.
Figure 4B:
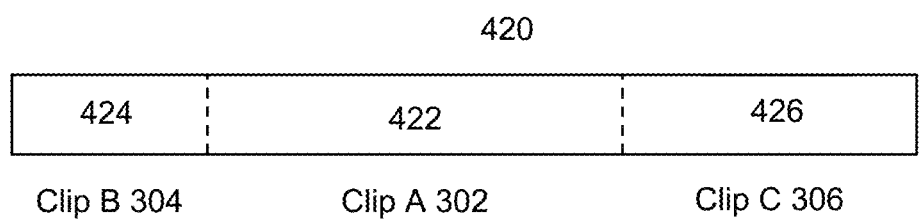

For example, FIGS. 4A and 4B illustrate example combined progress length elements 410, 420. In FIG. 4A, the combined progress length element 410 may include portions 412, 414, 416. The portion 412 may be continuous with (adjacent to) the portion 414, and the portion 414 may be continuous with the portion 416. The portion 412 may visually represent the progress length A 312 of the clip A 302. The portion 414 may visually represent the progress length B 314 of the clip B 304. The portion 416 may visually represent the progress length C 316 of the clip C 306.

In FIG. 4B, the combined progress length element 420 may include portions 422, 424, 426. The portion 424 may be continuous with the portion 422, and the portion 422 may be continuous with the portion 426. The portion 424 may visually represent the progress length B 314 of the clip B 304. The portion 422 may visually represent the progress length A 312 of the clip A 302. The portion 426 may visually represent the progress length C 316 of the clip C 306. Other ordering of the portions of the combined progress length element are contemplated.

Figure 4C:
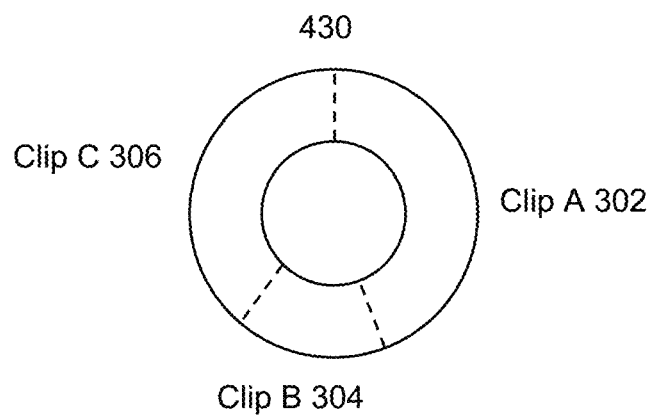

In some implementations, the combined progress length element may extend continuously in a single direction to visually represent the combined progress length of the multiple video clips. That is, the combined progress length element may extend in one direction with different positions along the single direction corresponding to different points/moments within the combined progress length of the multiple video clips. The single direction may include a translational direction or a rotational direction. FIGS. 4A and 4B illustrate examples of combined progress length element extending along a translational direction. In FIGS. 4A and 4B, the combined progress length element 410, 420 may extend continuously in a lateral direction (e.g., to the right) to visually represent the combined progress length of the clip A 302, the clip B 304, and the clip C 304. FIG. 4C illustrates an example of combined progress length element extending along a rotational direction. In FIG. 4C, a combined progress length element 430 may extend continuous in a clockwise direction to visually represent the combined progress length of the clip A 302, the clip B 304, and the clip C 304. In the combined progress length element 430 may form a circular loop so that the end of the progress length C 316 of the clip C 306 may be continuous with the beginning of the progress length A 312 of the clip A 302. The combined progress length element 430 may provide a looping seek bar/scubber so that when the playback reaches the end of the clip C 304, the playback returns to the beginning of the clip A 302. Other shapes of combined progress length element are contemplated.

The combined progress length element may provide a single place from which a user may see and/or interact with progress lengths of multiple video clips when generating a video edit. Providing separated visual representations of individual progress lengths of video clips, such as shown in FIG. 3, may require a user to click between different visual representations when determining which video portions are to be included in the video edit. The combined progress length element may enable the user to access different parts of all selected video clips and provide a single place from which the user may select video portions from all selected video clips for inclusion in the video edit. For example, referring to FIG. 4A, when a user reaches the end of the clip A 302 using the combined progress length element 410, the user may automatically be taken to the beginning of the clip B 304. When the user reaches the end of the clip B 304 using the combined progress length element 410, the user may automatically be taken to the beginning of the clip C 306. Thus, the user may scrub along the combined progress length element 310 to look through all of the clips 302, 304, 306. The combined progress length element may simulate all video clips selected for use in generating the video edit being joined into a single long video clip, without actually generating (encoding) the single long video clip.

In some implementations, ordering of the multiple video clips on the combined progress length element may be determined based on user input and/or other information. User input may define, characterize, and/or otherwise be used to determine the ordering of the multiple video clips on the combined progress length element. For example, a user may utilize one or more graphical user interfaces to select/change the order in which the video clips are to be represented on the combined progress length element. As another example, the ordering of the video clips on the combined progress length element may correspond to the order in which the video clips were selected by the user for use in generating the video edit.

In some implementations, ordering of the multiple video clips in the combined progress length element may be determined based on analysis of the video clips, analysis of information associated with the video clips, and/or other information. For example, ordering of the multiple video clips in the combined progress length element may be determined based on content of the multiple video clips and/or other information. The content of the video clips may be analyzed to determine characteristics of the content. For example, the content of the video clips may be classified based on the types of activity/depictions captured within the video clip and/or the number and/or types of highlight moment within the video clip. The video clips may be placed in a particular order in the combined progress length element based on the characteristics/classification of the content. In some implementations, the ordering of the video clips may be determined based on style and/or theme of the video edit to be generated. Other ordering of the video clips in the combined progress length element are contemplated.

The video portion selection component 106 may be configured to obtain selection of video portions for inclusion in the video edit. The video portions may be selected from multiple video clips. Obtaining selection of the video portions for inclusion in the video edit may include one or more of accessing, acquiring, analyzing, determining, examining, identifying, loading, locating, opening, receiving, retrieving, reviewing, storing, and/or otherwise obtaining the selection of the video portions for inclusion in the video edit. Selection of video portion for inclusion in a video edit may be obtained from a storage location, such as the electronic storage 13, from one or more hardware components, from one or more software components, from a user, and/or from other locations. For example, selection of video portion for inclusion in a video edit may have been stored in one or more files in a storage location, and the video portion selection component 106 may obtain the file(s) to obtain the selection. Selection of video portion for inclusion in a video edit may be obtained from hardware component(s) and/or software component(s) relaying user selection of the video portions through one or more graphical user interfaces.

In some implementations, selection of video portions for inclusion in a video edit may be obtained based on user input and/or other information. User input may define, characterize, and/or otherwise be used to determine selection of video portions for inclusion in a video edit. For example, a user may utilize one or more graphical user interfaces to select the video portions to be included in the video edit, and the selection of the video portions may be obtained based on user input received through user interaction with the graphical user interface(s).

In some implementations, selection of video portions for inclusion in a video edit may be obtained based on analysis of the video portions, analysis of information associated with the video portions, and/or other information. For example, video portions may be selected for inclusion in the video edit based on content of the video portions and/or other information. The content of the video portions may be analyzed to determine characteristics of the content. For example, the content of the video portions may be classified based on the types of activity/depictions captured within the video portions and/or the number and/or types of highlight moment within the video portions. The video portions may be selected to be included in the video edit based on the characteristics/classification of the content. In some implementations, the selection of video portions for inclusion in a video edit may be determined based on style and/or theme of the video edit to be generated.

In some implementations, a user may add, change, and/or remove highlight moments via interaction through one or more graphical user interfaces. The video portions selected for inclusion in the video edit may be changed based on user changes to the highlight moments. For example, a video portion may be added to the selection of video portions for inclusion in the video edit based on the user adding a corresponding highlight moment. A video portion may be removed from the selection of video portions for inclusion in the video edit based on the user removing a corresponding highlight moment. A video portion selected for inclusion in the video edit may be changed based on the user changing the corresponding highlight moment (e.g., changing timing of the highlight moment). Other selection of the video portions for inclusion in the video edit are contemplated.

The selected video portions may include one or more video portions from one or more video clips. The selected video portions may include video portions that are adjacent/continuous with another video portion and/or video portions that are non-adjacent/non-continuous with another video portion. For example, referring to FIG. 4A, the selected video portions may include a video portion of the clip A 302 and a video portion of the clip C 306. The selected video portions may not be adjacent/continuous with each other. The selected video portions may correspond to segments of the combined progress length element. For example, referring to FIG. 4A, the selected video portion of the clip A 302 may correspond to a segment of the portion 412 of the combined progress length element 410. The selected video portion of the clip C 362 may correspond to a segment of the portion 416 of the combined progress length element 410.

The selected video portions may be ordered for inclusion in the video edit. That is, the ordering in which the selected video portions appear within the video edit may be determined. In some implementations, ordering of the selected video portions in the video edit may be determined based on user input and/or other information. User input may define, characterize, and/or otherwise be used to determine the ordering of the selected video portions in the video edit. For example, a user may utilize one or more graphical user interfaces to select/change the order in which the video portions are to be included in the video edit. As another example, the ordering of the selected video portions in the video edit may correspond to the order in which the video portions were selected by the user for inclusion in the video edit.

In some implementations, ordering of the selected video portions in the video edit may be determined based on analysis of the video portions, analysis of information associated with the video portions, and/or other information. For example, the selected video portions may be ordered in the video edit based on content of the selected video portions and/or other information. For instance, the selected video portions may be placed in a particular order in the video edit based on the characteristics/classification of the content. In some implementations, the ordering of selected video portions may be determined based on style and/or theme of the video edit to be generated. Other ordering of the selected video portions in the video edit are contemplated.

The inclusion marker component 108 may be configured to present inclusion marker elements for the selected video portions. One or more inclusion marker elements may be presented for individual video portions selected for inclusion in the video edit. The inclusion marker elements may visually indicate the selected video portions using the combined progress length element. The inclusion marker elements may be positioned adjacent to and/or within the combined progress length element (e.g., overlaid on top of the combined progress length element). The inclusion marker elements may visually convey which portions and how much of the combined progress length of the multiple video clips have been selected for inclusion in the video edit. The inclusion marker elements may visually distinguish segments of the combined progress length element corresponding to the selected video portions from segments of the combined progress length element corresponding to non-selected video portions.

Figure 5A:
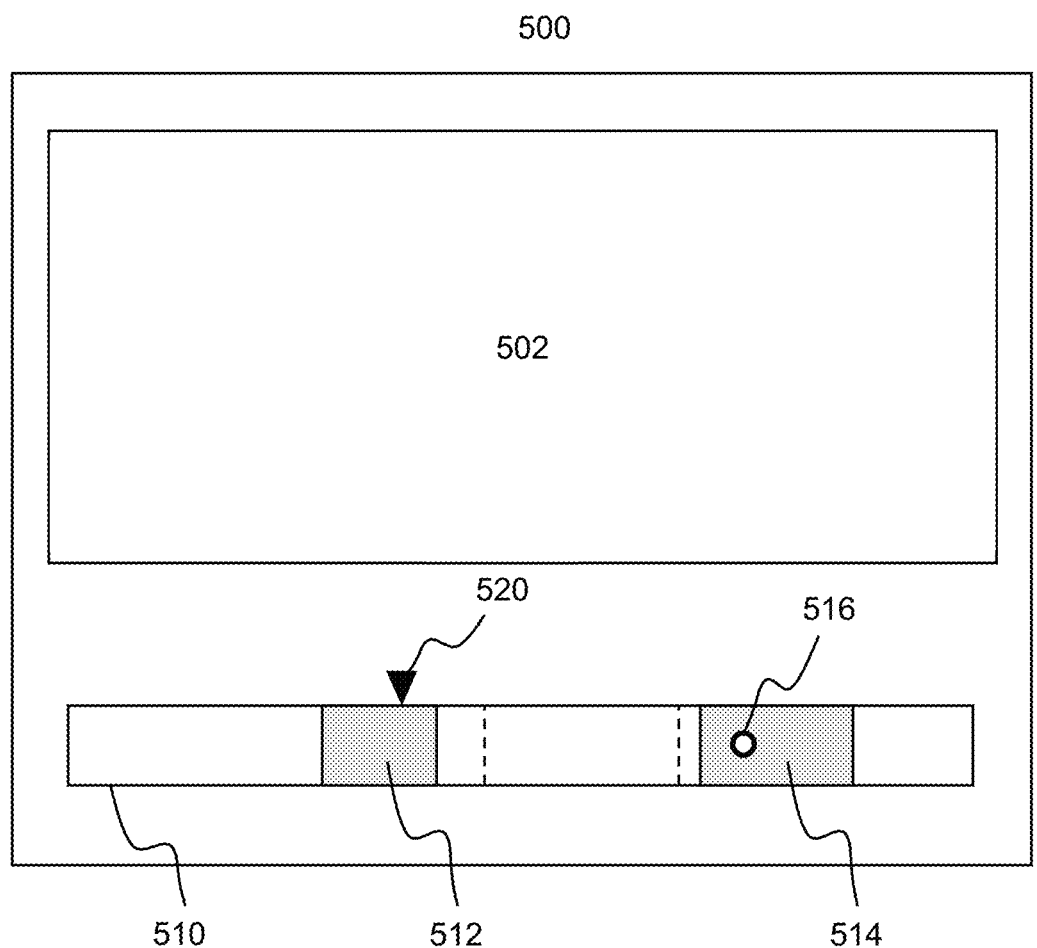
FIGS. 5A, 5B, and 5C illustrate example graphical user interfaces for editing multiple video clips.
Figure 5B:
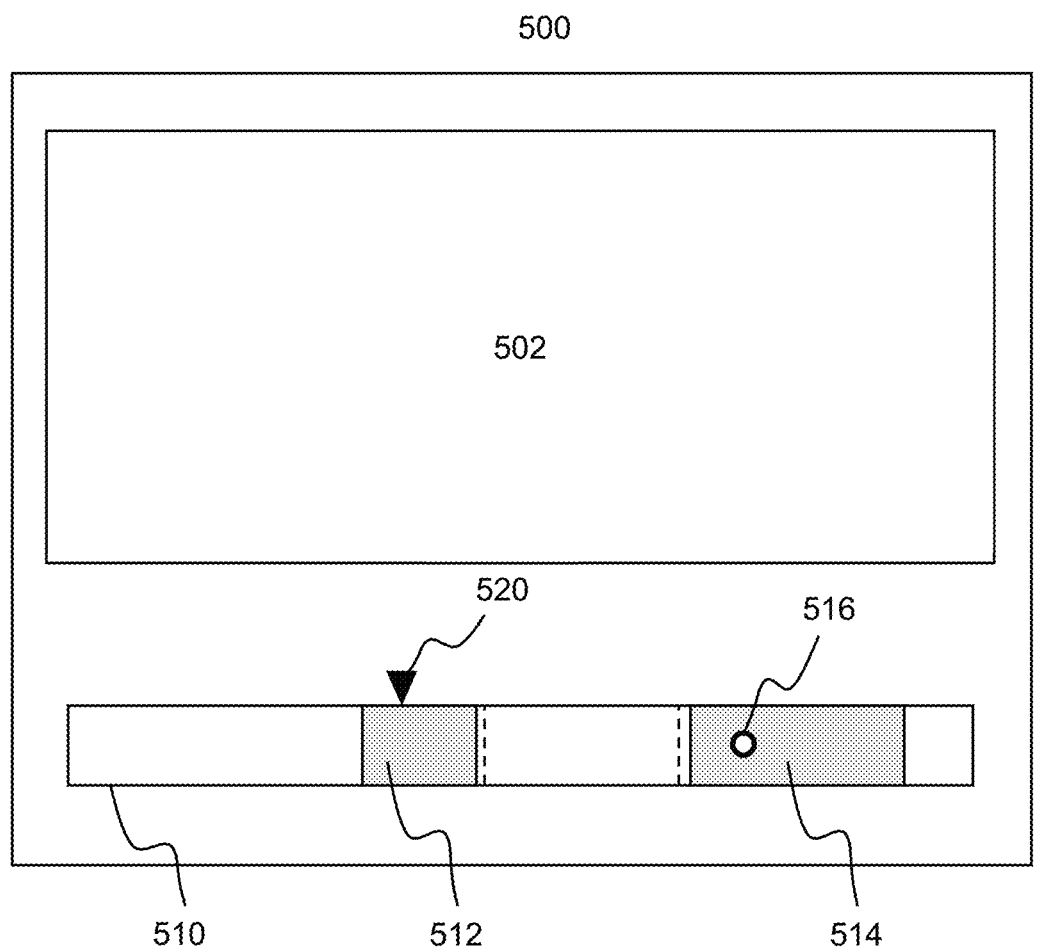
Figure 5C:
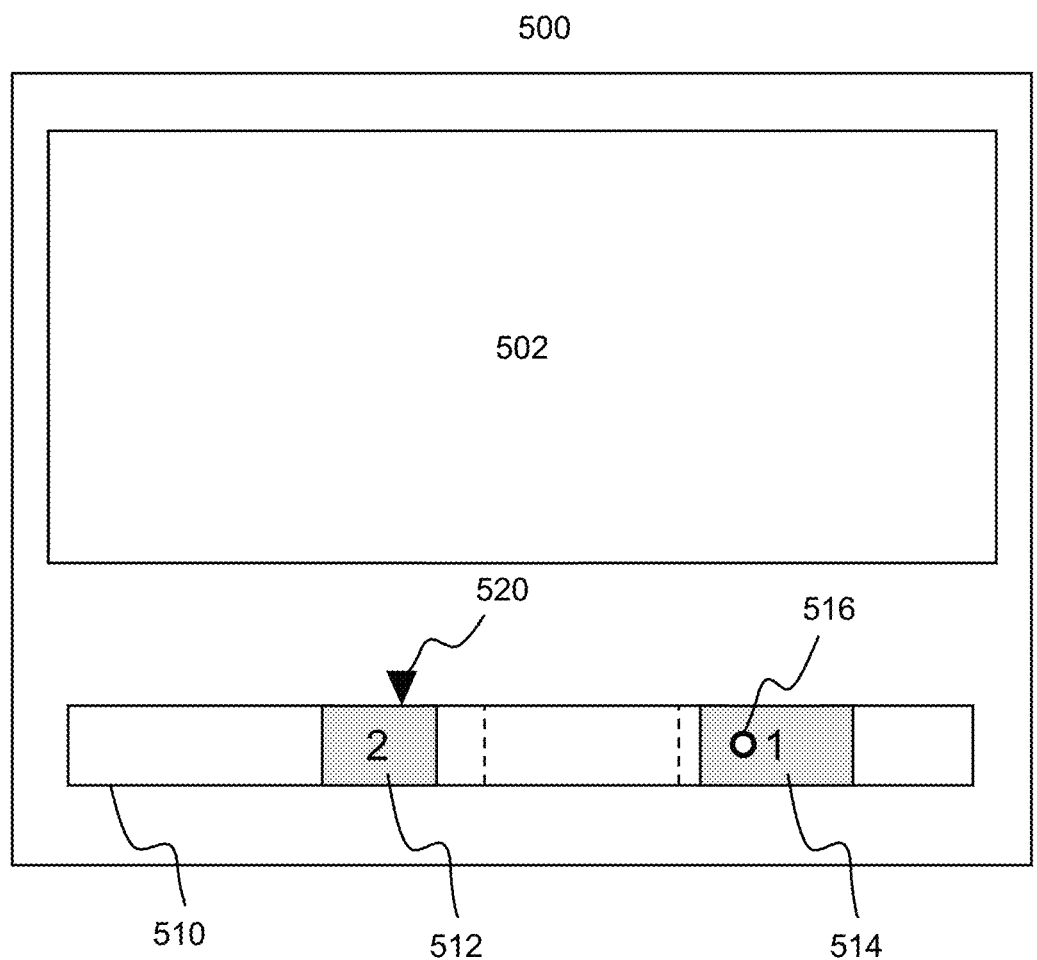

For example, FIGS. 5A, 5B, and 5C illustrate example graphical user interfaces for editing multiple video clips. These graphical user interfaces are provided merely as examples, and the arrangement and visual aspects of the graphical user interfaces may vary depending on the implementation. In some implementations, the graphical user interfaces may include additional features and/or alternative features. In some implementations, the graphical user interfaces may not include features shown in FIGS. 5A, 5B, and 5C.

Referring to FIG. 5A, a graphical user interface 500 may include a playback portion 502. The playback portion 502 may include presentation of videos, such as presentation of video clips, presentation of video portions, presentation of video edits, and/or other presentation of videos. The graphical user interface 500 may include one or more interface elements that facilitate selection of video portions of video clips. The video portions may be selected for inclusion in a video edit. For example, the graphical user interface 500 may include a combined progress length element 510. The combined progress length element 510 may visually represent combined progress length of multiple video clips. For example, the combined progress length element 510 may visually represent combined progress lengths of three video clips (Clip A 302, Clip B 304, Clip C 306) as shown in FIG. 4A. In some implementations, the combined progress length element 510 may provide indicators that distinguish the progress lengths of individual video clips. For instance, the combined progress length element 510 may use different colors to represent progress lengths of different video clips and/or use markers (e.g., dividers, dashed lines) to indicate boundaries of the progress lengths of different video clips.

The graphical user interface 500 may include inclusion marker elements 512, 514. The inclusion marker elements 512, 514 may visually indicate portions of the video clips that have been selected for inclusion in a video edit using the combined progress length element 510. For example, a video portion of the first video clip (e.g., Clip A 302) and a video portion of the third video clip (e.g., Clip C 306) may have been selected for inclusion in the video edit. In FIG. 5A, the inclusion marker element 512 may visually mark the segment of the combined progress length element 510 corresponding to the selected video portion of the first video clip, and the inclusion marker element 514 may visually mark the segment of the combined progress length element 510 corresponding to the selected video portion of the third video clip.

In some implementations, the inclusion marker elements 512, 514 may visually mark the corresponding segments of the combined progress length element 510 using colors, patterns, and/or other visual features. For example, the inclusion marker elements 512, 514 may color the corresponding segments of the combined progress length element 510 using color(s) and/or pattern(s) differently from other segments of the combined progress length element 510. In some implementations, the inclusion marker elements 512, 514 may visually mark the corresponding segments of the combined progress length element 510 using one or more border elements. A border element may mark a boundary of a segment of the combined progress length element 510. For example, the inclusion marker elements 512, 514 may include handles to indicate the starting and ending positions of the segments corresponding to the selected video portions. Use of the inclusion marker elements 512, 514 with the combined progress length element 510 may enable a user to quickly/easily determine which portions of the video clips have and have not been selected for inclusion in the video edit. Use of the inclusion marker elements 512, 514 with the combined progress length element 510 may enable a user to quickly/easily determine how much of the total progress lengths of the video clips have and have not been selected for inclusion in the video edit.

The graphical user interface may include other interface elements that facilitate selection of video portions of video clips for inclusion in a video edit. For example, the graphical user interface may include interface element(s) that enable a user to add a video portion for inclusion in the video edit, interface element(s) that enable a user to remove video portion from inclusion in the video edit, and/or interface element(s) that enable a user to change video portion selected for inclusion in the video edit. As another example, the graphical user interface may include interface element(s) that provides visual cues as to characteristics of the video clips and/or the video portions. For instance, referring to FIG. 5A, the graphical user interface 500 may include a highlight marker 516. The highlight marker 516 may indicate the location of a highlight moment/event in the third video clip. The highlight marker 516 may be located within and/or along the combined progress length element 510 to visually indicate the location of the highlight moment/event within the combined progress length of the video clips.

In some implementations, a user may manipulate the inclusion marker elements to change which portions of multiple video clips are included in the video edit. The inclusion marker elements may be manipulable along the combined progress length element to change which portions of the video clips are selected for inclusion in the video edit. The inclusion markers may be manipulable along the combined progress length element to change the position of the selected video portions along the combined progress length of the video clip. Manipulation of the inclusion marker elements may include extending, shrinking, shifting, and/or other manipulation of the inclusion marker elements.

Extending an inclusion marker element may refer to manipulation of the inclusion marker element to increase the size of the inclusion marker element, which results in greater amount of video portion being selected for inclusion in the video edit. For example, boundar(ies) and/or handle(s) of an inclusion marker element may be moved out to increase the size of the inclusion marker element. Manipulation of the inclusion marker to extend the inclusion marker along the combined progress length element may cause the length of the corresponding video portion to increase. For example, referring to FIG. 5B, the size of the inclusion marker element 514 may have been increased by pushing out the boundaries of the inclusion marker element 514. Such manipulation of the inclusion marker element 514 may result in greater portion of the third video clip being selected for inclusion in the video edit.

Shrinking an inclusion marker element may refer to manipulation of the inclusion marker element to decrease the size of the inclusion marker element, which results in lesser amount of video portion being selected for inclusion in the video edit. For example, boundar(ies) and/or handle(s) of an inclusion marker element may be moved in to decrease the size of the inclusion marker element. Manipulation of the inclusion marker to shrink the inclusion marker along the combined progress length element may cause the length of the corresponding video portion to decrease.

Shifting an inclusion marker element may refer to manipulation of the inclusion marker element to move the inclusion marker element along the combined progress length element, which results in different video portions of same duration being selected for inclusion in the video edit. For example, the inclusion marker element may be dragged to different positions along the combined progress length element to change the position of the inclusion marker element. Manipulation of the inclusion marker to shift the inclusion marker along the combined progress length element may cause beginning and end of the corresponding video portion to shift. For example, referring to FIG. 5B, the inclusion marker element 512 may have been shifted to the right. Such manipulation of the inclusion marker element 512 may result in movement to the right of the beginning and end of the corresponding video portion. Other manipulation of the inclusion marker elements are contemplated.

In some implementations, inclusion marker elements may be manipulable to cover progress lengths of different video clips. A single marker element may be allowed to cover progress lengths of multiple video clips. Boundaries of video clips may be ignored in manipulation of the inclusion marker elements. In some implementations, inclusion marker elements may not be manipulable to cover progress lengths of different video clips. A single marker element may be allowed to cover progress length of a single video clip. Boundaries of video clips may limit how far the edges of the inclusion marker elements may be moved. In some implementations, the boundaries of video clips may work as soft limits for manipulation of the inclusion marker elements. A soft limit may initially prevent an inclusion marker element from covering progress lengths of multiple video clips, but may be overridden by a user. For instance, referring to FIG. 5B, a user may manipulate the inclusion marker element 512 to move the inclusion marker element to cover a portion of the first video clip and a portion of the second video clip. The user's first attempt to the move the inclusion marker element 512 across the boundary between the first video clip and the second video clip may be stopped at the end of the first video clip. The user's subsequent attempt (e.g., continuing to drag the inclusion marker element 512 for a duration of time, a second attempt to drag the inclusion marker element 512 within a threshold duration of the first attempt) may be allowed and the inclusion marker element 512 may be moved to cross the boundary between the first video clip and the second video clip.

The graphical user interface may include a current position element. The current position element may be positioned along the combined progress length element to visually indicate current position of presentation of the video clips. That is, the current position element may indicate the play position along the combined progress lengths of the multiple video clips. For example, referring to FIG. 5A, the graphical user interface 500 may include a current position element 520. The current position element 520 may represent current play position for the video clips. The current position element 520 may visually indicate current position of the presentation of the video clips along the combined progress length of the video clips. In some implementation, the current position element 520 may include and/or be accompanied by information providing details on the current play position for the video clips. For example, the current position element 520 may include and/or be accompanied by information on the time position (e.g., minute: second) and/or frame position (e.g., frame number) of the video that is being presented within the playback portion 502.

The video edit may be presented within the playback portion 502. The presentation of the video edit may include presentation of video portions indicated by the inclusion marker elements. In some implementations, a preview of the video edit may be presented within the playback portion 502 without encoding of the video edit. The video edit may be encoded as a new video clip once the video edit has been finalized.

Presentation of the video edit on a display may include movement of the current position element 520 along the combined progress length element 510 to visually indicate current position of the presentation along the combined progress length of the multiple video clips. The current position element 520 may skip the segments of the combined progress length element 510 that are not within the inclusion marker elements 512, 514. The current position element 520 may move along the segments of the combined progress length element 510 that are within the inclusion marker elements 512, 514. For example, when the current position element 520 has reached the end of the segment of the combined progress length element 510 covered by the inclusion marker element 512, the current position element 520 may skip from the end of that segment to the beginning of the segment of the combined progress length element 510 covered by the inclusion marker element 514. This skipping of the current position element 520 may reflect transition of the presentation of the video edit from the end of the video portion (of the first video clip) covered by the inclusion marker element 512 to the beginning of the video portion (of the third video clip) covered by the inclusion marker element 514.

In some implementations, the position of the current position element 520 may be manipulable along the combined progress length element 510 to change the current position of the presentation along the combined progress length of the multiple video clips. That is, a user may manually move the position of the current position element 520 along the combined progress length element 510 to change which part of the selected video portions is presented within the playback portion 502. Manipulation of the current position element 520 may include dragging of the current position element 520 along the combined progress length element 510, jumping of the current position element 520 along the combined progress length element 510, and/or other manipulation of the current position element 520.

In some implementations, the graphical user interface may provide other information regarding the video edit. For example, the graphical user interface may provide information on the ordering of the video portions selected for inclusion in the video clip. For instance, as shown in FIG. 5C, the graphical user interface 500 may include numbers within the inclusion marker elements 512, 514 to visually indicate ordering of the corresponding video clips in the video edit. In the example shown in FIG. 5C, the ordering of the video portions in the video edit may first include the video portion selected from the third video clip (indicated by the inclusion marker element 514) and may then include the video portion selected from the first video clip (indicated by the inclusion marker element 512). Such visualization o the ordering of the selected video portions may enable a user to quickly/easily determine the order in which the selected video portion will be presented.

As another example, the graphical user interface may provide information on edits made to the selected video portions. For instance, the selected video portions may have been edited to include visual effects (e.g., change in color, zoom, warping) and the graphical user interface may provide information on location and/or type of visual effects added to the selected video portions. Selected video portions may have been edited to include temporal effects (e.g., speed ramp, increased playback speed, decreased playback speed, reverse playback) and the graphical user interface may provide information on location and/or type of temporal effects added to the selected video portions. Presentation of other information is contemplated.

Figure 6A:
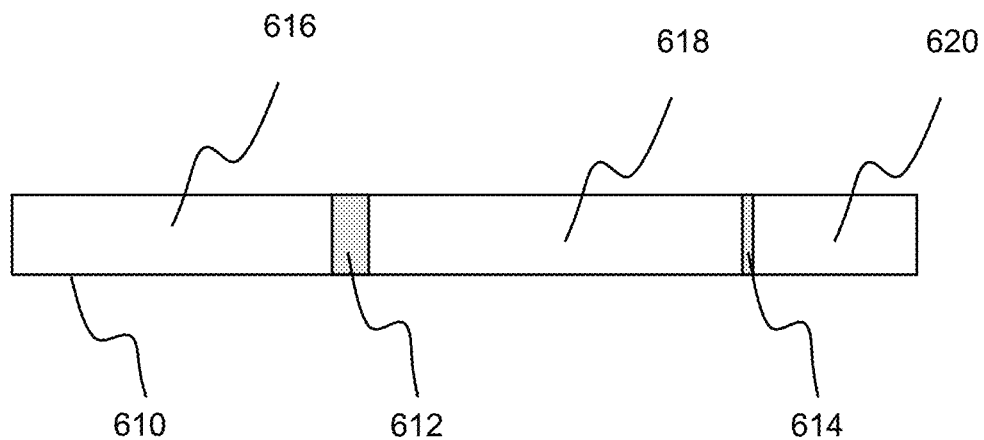
FIGS. 6A and 6B illustrate example combined progress length elements and inclusion marker elements.
Figure 6B:
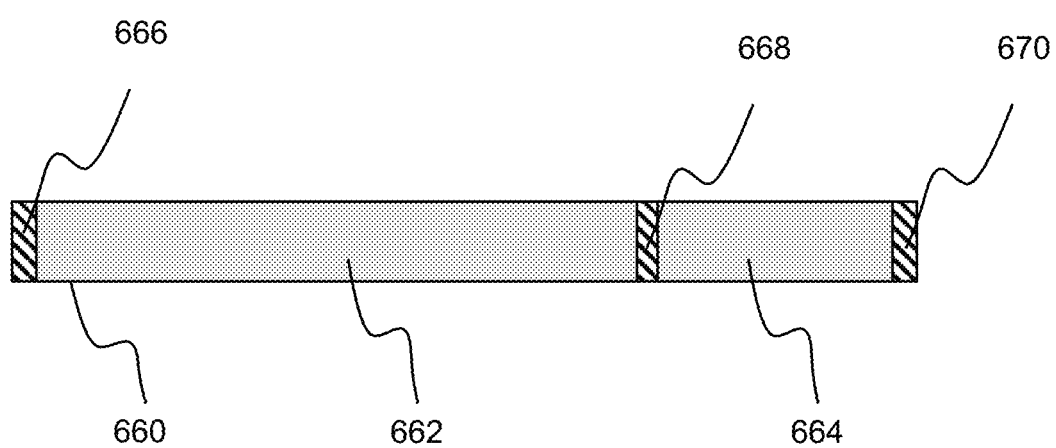

In some implementations, same amount of progress length (e.g., time duration) of the video clips may be represented by same length of the combined progress length element. In some implementations, different amounts of progress length (e.g., time duration) of the video clips may be represented by same length of the combined progress length element. For example, FIGS. 6A and 6B illustrate example combined progress length elements and inclusion marker elements. In FIG. 6A, a combined progress length element 610 may visually represent combined progress length of multiple video clips. Inclusion marker elements 612, 614 may visually indicate video portions selected for inclusion in a video edit. The combined progress length element 610 may include segments 616, 618, 620 corresponding to non-selected video portions. The lengths of different segments of the combined progress length element 610 may be scaled to the corresponding progress lengths (e.g., duration) of the video portions. For example, the inclusion marker element 612 may cover a greater extent of the combined progress length element 610 than the inclusion marker element 614 to visually indicate that the selected video portion corresponding to the inclusion marker element 612 is longer than the selected video portion corresponding to the inclusion marker element 614. The lengths of the segments 616, 618, 620 corresponding to non-selected video portions may visually indicate different lengths of the video portions surrounding the selected video portions. Such representation of the selected and non-selected segments of the combined progress length may enable a user to quickly/easily determine how much and which portions of the combined progress length have been selected for inclusion in the video edit.

In FIG. 6B, a combined progress length element 660 may visually represent combined progress length of multiple video clips. Inclusion marker elements 662, 664 may visually indicate video portions selected for inclusion in a video edit. The combined progress length element 660 may include segments 666, 668, 670 corresponding to non-selected video portions. The lengths of selected segments of the combined progress length element 660 may be scaled to the corresponding progress lengths (e.g., duration) of the selected video portions. For example, the inclusion marker element 662 may cover a greater extent of the combined progress length element 660 than the inclusion marker element 664 to visually indicate that the selected video portion corresponding to the inclusion marker element 662 is longer than the selected video portion corresponding to the inclusion marker element 664. The lengths of non-selected segments of the combined progress length element 660 may not be scaled to the corresponding progress lengths (e.g., duration) of the non-selected video portions. For example, the lengths of the segments 666, 668, 670 corresponding to non-selected video portions may not visually indicate different lengths of the video portions surrounding the selected video portions. The lengths of non-selected segments of the combined progress length element 660 may be compressed to provide more space for the selected segments. Such representation of the selected and non-selected segments of the combined progress length may enable a user to focus on the portions of the combined progress length that have been selected for inclusion in the video edit.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
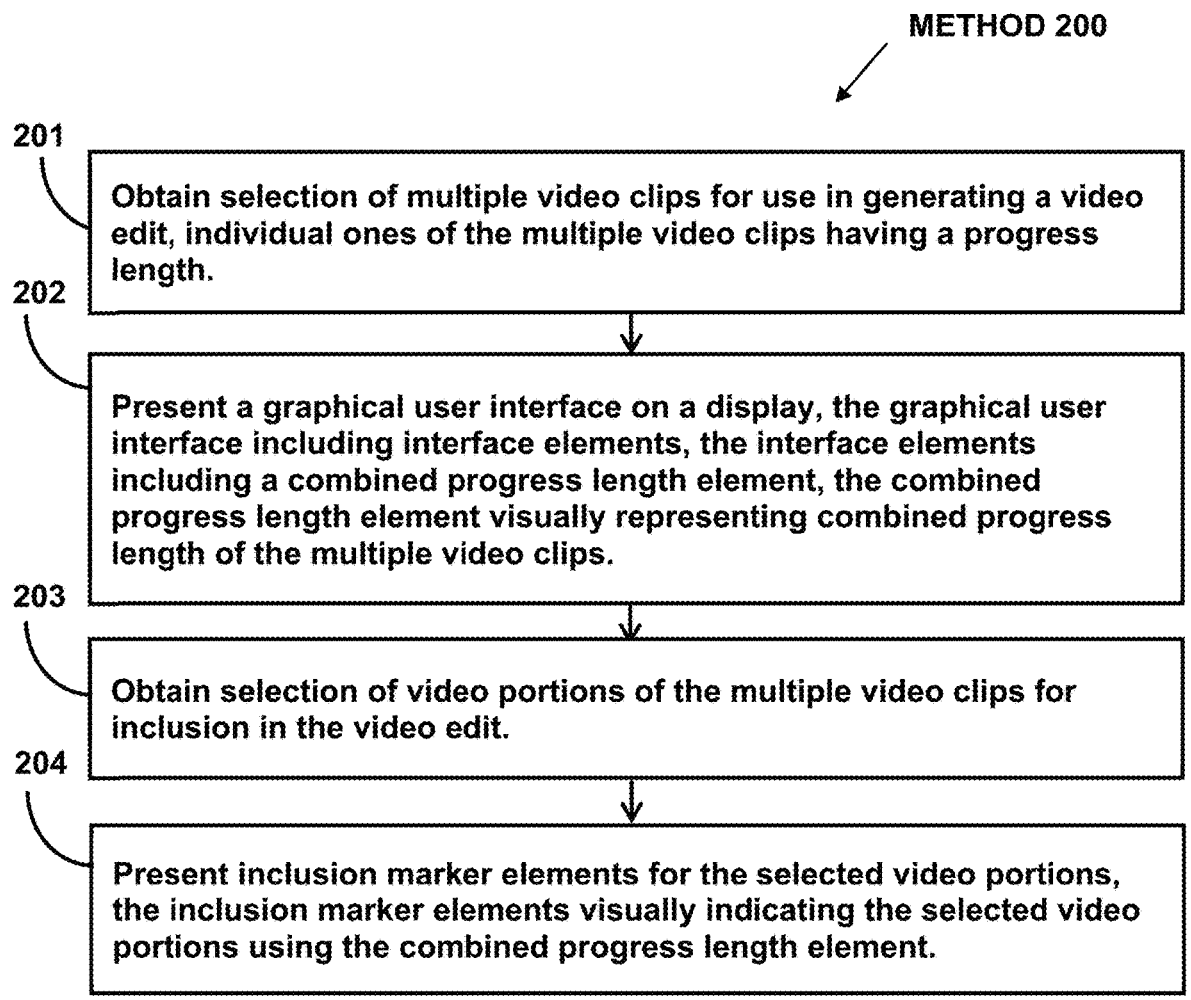
FIG. 2 illustrates a method for presenting an interface for editing multiple video clips.

FIG. 2 illustrates method 200 for presenting an interface for editing multiple video clips. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, selection of multiple video clips for use in generating a video edit may be obtained. Individual ones of the multiple video clips may have a progress length. The multiple video clips may include a first video clip having a first progress length, a second video clip having a second progress length, and/or other video clips. In some implementation, operation 201 may be performed by a processor component the same as or similar to the video clip selection component 102 (Shown in FIG. 1 and described herein).

At operation 202, a graphical user interface may be presented on a display. The graphical user interface may include interface elements that facilitate selection of video portions of the multiple video clips for inclusion in the video edit. The interface elements may include a combined progress length element and/or other interface elements. The combined progress length element may visually represent combined progress length of the multiple video clips. The combined progress length element may include a first portion, a second portion continuous with the first portion, and/or other portions. The first portion of the combined progress length element may visually represent the first progress length of the first video clip and the second portion of the combined progress length element may visually represent the second progress length of the second video clip. In some implementations, operation 202 may be performed by a processor component the same as or similar to the graphical user interface component 104 (Shown in FIG. 1 and described herein).

At operation 203, selection of the video portions of the multiple video clips for inclusion in the video edit may be obtained. The selected video portions may include a first video portion, a second video portion, and/or other video portions. The second video portion may be non-adjacent to the first video portion. The first video portion may correspond to a first segment of the combined progress length element and the second video portion may correspond to a second segment of the combined progress length element. In some implementations, operation 203 may be performed by a processor component the same as or similar to the video portion selection component 106 (Shown in FIG. 1 and described herein).

At operation 204, inclusion marker elements for the selected video portions may be presented. The inclusion marker elements may visually indicate the selected video portions using the combined progress length element. The inclusion marker elements may include a first inclusion marker element, a second inclusion marker element, and/or other inclusion marker elements. The first inclusion marker element may visually mark the first segment of the combined progress length element corresponding to the first video portion, and the second inclusion marker element may visually mark the second segment of the combined progress length element corresponding to the second video portion. Presentation of the video edit on the display may include movement of a current position element along the combined progress length element to visually indicate current position of the presentation along the combined progress length of the multiple video clips. The current position element may skip from end of the first segment of the combined progress length element to beginning of the second segment of the combined progress length element during transition of the presentation of the video edit from end of the first video portion to beginning of the second video portion. In some implementations, operation 204 may be performed by a processor component the same as or similar to the inclusion marker component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that presents an interface for editing multiple video clips, the system comprising:
one or more physical processors configured by machine-readable instructions to:
obtain selection of the multiple video clips for use in generating a video edit, individual ones of the multiple video clips having a progress length, the multiple video clips including a first video clip having a first progress length and a second video clip having a second progress length;
present a graphical user interface on a display, the graphical user interface including interface elements that facilitate selection of video portions of the multiple video clips for inclusion in the video edit, the interface elements including a combined progress length element, the combined progress length element visually representing combined progress length of the multiple video clips, the combined progress length element including a first portion and a second portion continuous with the first portion, the first portion of the combined progress length element visually representing the first progress length of the first video clip and the second portion of the combined progress length element visually representing the second progress length of the second video clip;
obtain the selection of the video portions of the multiple video clips for inclusion in the video edit, the selected video portions including a first video portion and a second video portion, the second video portion non-adjacent to the first video portion, the first video portion corresponding to a first segment of the combined progress length element and the second video portion corresponding to a second segment of the combined progress length element, wherein the second segment is after the first segment; and
present inclusion marker elements for the selected video portions, the inclusion marker elements visually indicating the selected video portions using the combined progress length element, the inclusion marker elements including a first inclusion marker element and a second inclusion marker element, the first inclusion marker element visually marking the first segment of the combined progress length element corresponding to the first video portion and the second inclusion marker element visually marking the second segment of the combined progress length element corresponding to the second video portion, wherein the second inclusion marker element is positioned along the combined progress length element after the first inclusion marker element based on the second segment of the combined progress length element corresponding to the second video portion being after the first segment of the combined progress length element corresponding to the first video portion;
wherein:
presentation of the video edit on the display includes movement of a current position element along the combined progress length element to visually indicate current position of the presentation along the combined progress length of the multiple video clips, the current position element skipping from end of the first segment of the combined progress length element to beginning of the second segment of the combined progress length element during transition of the presentation of the video edit from end of the first video portion to beginning of the second video portion,
ordering of the selected video portions in the video edit defines an order in which the selected video portions are presented during playback of the video edit such that responsive to the ordering of the selected video portions in the video edit including the second video portion before the first video portion, the playback of the video edit includes presentation of the second video portion before the first video portion;
information on the ordering of the selected video portions in the video edit is provided by the graphical user display via numbers within the inclusion marker elements, wherein a first number within the first inclusion marker element is greater than a second number within the second inclusion marker element to indicate that the playback of the video edit includes the presentation of the second video portion before the first video portion even though the second inclusion marker element for the second video portion is positioned along the combined progress length element after the first inclusion marker element for the first video portion;

lengths of the combined progress length element corresponding to the selected video portions are scaled to lengths of the selected video portions such that the first segment of the combined progress length element corresponding to the first video portion is longer than the second segment of the combined progress length element corresponding to the second video portion based on the first video portion being longer than the second video portion; and lengths of the combined progress length element corresponding to non-selected video portions are not scaled to lengths of the non-selected video portions such that a third segment of the combined progress length element corresponding to a first non-selected video portion is same length as a fourth segment of the combined progress length element corresponding to a second non-selected video portion even when the first non-selected video portion is longer or shorter than the second non-selected video portion.

2. The system of claim 1, wherein the combined progress length element extends continuously in a single rotational direction to visually represent the combined progress length of the multiple video clips, the combined progress length element extending continuously in the single rotational direction to form a loop, wherein an end of the combined progress length is continuous with a beginning of the combined progress length such that when the playback reaches the end of the combined progress length, the playback returns to the beginning of the combined progress length.

3. The system of claim 2, wherein position of the current position element is manipulable along the combined progress length element to change the current position of the presentation along the combined progress length of the multiple video clips.

4. The system of claim 3, wherein the first inclusion marker element is manipulable along the combined progress length element to change position of the first video portion along the combined progress length of the multiple video clips.

5. The system of claim 4, wherein manipulation of the first inclusion marker to extend or shrink the first inclusion marker along the combined progress length element causes a length of the first video portion to increase or decrease.

6. The system of claim 5, wherein manipulation of the first inclusion marker to shift the first inclusion marker along the combined progress length element causes beginning and end of the first video portion to shift.

7. The system of claim 1, wherein ordering of the multiple video clips on the combined progress length element is determined based on user input.

8. The system of claim 1, wherein ordering of the multiple video clips in the combined progress length element is determined based on content of the multiple video clips.

9. The system of claim 1, wherein the ordering of the selected video portions in the video edit is determined based on user input.

10. The system of claim 1, wherein the ordering of the selected video portions in the video edit is determined based on content of the selected video portions.

11. A method for presenting an interface for editing multiple video clips, the method performed by a computing system including one or more processors, the method comprising:

obtaining, by the computing system, selection of the multiple video clips for use in generating a video edit, individual ones of the multiple video clips having a progress length, the multiple video clips including a first video clip having a first progress length and a second video clip having a second progress length;

presenting, by the computing system, a graphical user interface on a display, the graphical user interface including interface elements that facilitate selection of video portions of the multiple video clips for inclusion in the video edit, the interface elements including a combined progress length element, the combined progress length element visually representing combined progress length of the multiple video clips, the combined progress length element including a first portion and a second portion continuous with the first portion, the first portion of the combined progress length element visually representing the first progress length of the first video clip and the second portion of the combined progress length element visually representing the second progress length of the second video clip;

obtaining, by the computing system, the selection of the video portions of the multiple video clips for inclusion in the video edit, the selected video portions including a first video portion and a second video portion, the second video portion non-adjacent to the first video portion, the first video portion corresponding to a first segment of the combined progress length element and the second video portion corresponding to a second segment of the combined progress length element, wherein the second segment is after the first segment; and presenting, by the computing system, inclusion marker elements for the selected video portions, the inclusion marker elements visually indicating the selected video portions using the combined progress length element, the inclusion marker elements including a first inclusion marker element and a second inclusion marker element, the first inclusion marker element visually marking the first segment of the combined progress length element corresponding to the first video portion and the second inclusion marker element visually marking the second segment of the combined progress length element corresponding to the second video portion, wherein the second inclusion marker element is positioned along the combined progress length element after the first inclusion marker element based on the second segment of the combined progress length element corresponding to the second video portion being after the first segment of the combined progress length element corresponding to the first video portion;

wherein:

presentation of the video edit on the display includes movement of a current position element along the combined progress length element to visually indicate current position of the presentation along the combined progress length of the multiple video clips, the current position element skipping from end of the first segment of the combined progress length element to beginning of the second segment of the combined progress length element during transition of the presentation of the video edit from end of the first video portion to beginning of the second video portion;

ordering of the selected video portions in the video edit defines an order in which the selected video portions are presented during playback of the video edit such that responsive to the ordering of the selected video portions in the video edit including the second video portion before the first video portion, the playback of the video edit includes presentation of the second video portion before the first video portion;

information on the ordering of the selected video portions in the video edit is provided by the graphical user display via numbers within the inclusion marker elements, wherein a first number within the first inclusion marker element is greater than a second number within the second inclusion marker element to indicate that the playback of the video edit includes the presentation of the second video portion before the first video portion even though the second inclusion marker element for the second video portion is positioned along the combined progress length element after the first inclusion marker element for the first video portion;

lengths of the combined progress length element corresponding to the selected video portions are scaled to lengths of the selected video portions such that the first segment of the combined progress length element corresponding to the first video portion is longer than the second segment of the combined progress length element corresponding to the second video portion based on the first video portion being longer than the second video portion; and lengths of the combined progress length element corresponding to non-selected video portions are not scaled to lengths of the non-selected video portions such that a third segment of the combined progress length element corresponding to a first non-selected video portion is same length as a fourth segment of the combined progress length element corresponding to a second non-selected video portion even when the first non-selected video portion is longer or shorter than the second non-selected video portion.

12. The method of claim 11, wherein the combined progress length element extends continuously in a single rotational direction to visually represent the combined progress length of the multiple video clips, the combined progress length element extending continuously in the single rotational direction to form a loop, wherein an end of the combined progress length is continuous with a beginning of the combined progress length such that when the playback reaches the end of the combined progress length, the playback returns to the beginning of the combined progress length.

13. The method of claim 12, wherein position of the current position element is manipulable along the combined progress length element to change the current position of the presentation along the combined progress length of the multiple video clips.

14. The method of claim 13, wherein the first inclusion marker element is manipulable along the combined progress length element to change position of the first video portion along the combined progress length of the multiple video clips.

15. The method of claim 14, wherein manipulation of the first inclusion marker to extend or shrink the first inclusion marker along the combined progress length element causes a length of the first video portion to increase or decrease.

16. The method of claim 15, wherein manipulation of the first inclusion marker to shift the first inclusion marker along the combined progress length element causes beginning and end of the first video portion to shift.

17. The method of claim 11, wherein ordering of the multiple video clips on the combined progress length element is determined based on user input.

18. The method of claim 11, wherein ordering of the multiple video clips in the combined progress length element is determined based on content of the multiple video clips.

19. The method of claim 11, wherein the ordering of the selected video portions in the video edit is determined based on user input.

20. The method of claim 11, wherein the ordering of the selected video portions in the video edit is determined based on content of the selected video portions.

\* \* \* \* \*